(12) United States Patent
Berndt et al.

(10) Patent No.: US 7,027,053 B2
(45) Date of Patent: Apr. 11, 2006

(54) GRAPHICAL USER INTERFACE FOR INDICATING DEVICE FAILOVER

(75) Inventors: Becky V. Berndt, Broomfield, CO (US); Daniel J. Maslowski, Erie, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 267 days.

(21) Appl. No.: 10/086,962

(22) Filed: Feb. 28, 2002

(65) Prior Publication Data

US 2003/0160781 A1 Aug. 28, 2003

(51) Int. Cl.
*G06T 13/00* (2006.01)

(52) U.S. Cl. .................. 345/473; 345/597; 345/419; 714/6; 714/9

(58) Field of Classification Search ............. 345/419, 345/473, 597; 714/6, 9
See application file for complete search history.

(56) References Cited

U.S. PATENT DOCUMENTS

| 5,790,775 | A | * | 8/1998 | Marks et al. ............. 714/9 |
| 6,154,209 | A | | 11/2000 | Naughton et al. |
| 6,268,850 | B1 | | 7/2001 | Ng |
| 6,271,838 | B1 | | 8/2001 | Gentner et al. |
| 6,421,711 | B1 | * | 7/2002 | Blumenau et al. ........ 709/213 |
| 6,625,747 | B1 | * | 9/2003 | Tawil et al. ............. 714/6 |

OTHER PUBLICATIONS

Sun Microsystems, Inc, "SunStorEdge™T3 Array," A Technical White Paper, Jul. 2000, pp. 1–42.

* cited by examiner

*Primary Examiner*—Kimbinh T. Nguyen
(74) *Attorney, Agent, or Firm*—Finnegan, Henderson, Farabow, Garrett & Dunner, L.L.P.

(57) ABSTRACT

A computer-implemented method and apparatus for indicating a failover data path in a graphical user interface environment is provided. The method includes graphically displaying at least one source device; graphically displaying at least one target device; graphically displaying a first data path between at least one source device and at least one target device; and in response to a failure in the first data path: graphically indicating the failure in the first data path; and graphically displaying a failover data path.

4 Claims, 6 Drawing Sheets

GRAPHICAL USER INTERFACE FOR INDICATING DEVICE FAILOVER

BACKGROUND OF THE INVENTION

Many modern computer systems, particularly enterprise-class systems, are provided with redundant components to provide continuous uptime in the event that one of the system's components fails. In many such systems, the redundancy can be provided by including a pair of identical components which perform the same function in parallel. In the event that one of the redundant components fails, the other component will perform the function alone. This transition from one component to another can be referred to as a "failover." In other systems, the redundant component is treated as a spare component and is not utilized until after the primary component fails.

Storage systems, for example, may be provided with dual data paths for receiving I/O data from an application host. One such system is the StorEdge T3 Array** sold by Sun Microsystems, Inc., of Palo Alto, Calif. In the event that one of the data paths fails, due to a failure in, for example, the host adapter card on the application host system, the Fibre Channel ("FC") cable, or FC port on the StorEdge T3 Array, the other data path will handle all of the I/O traffic with the host application.

** StorEdge is a registered trademark of Sun Microsystems, Inc.

Existing storage systems can monitor redundant data paths and automatically manage the failover to a redundant data path in the event of a failure. However, when a component in these storage systems fails, the system may lose its redundancy protection. Therefore, if the corresponding failover component subsequently fails and there are no other redundant components available, the entire system may fail. Systems which simply manage the failover to the redundant data path but do not adequately warn the system operator of the failure may be left in a non-redundant state for an extended period of time. This increases the chances that the failover component will also fail before the first failed component is replaced. Accordingly, it may be desirable to indicate the first failure to a user in time to enable the user to take steps to replace the failed component promptly before any further failures occur.

In addition, it may also be desirable to warn the user of the failure in an immediately apparent way. Some systems may record the failure in an error log. This error log may be easily accessible to the system operator, but it is unlikely that the operator would review the error log without a more prominent warning. Furthermore, a textual message on a computer screen may not have sufficient visibility to alert an inattentive operator.

BRIEF SUMMARY OF THE INVENTION

In accordance with embodiments of the present invention, a computer-implemented method of indicating a failover data path in a graphical user interface environment is provided. The method comprises: graphically displaying at least one source device; graphically displaying at least one target device; graphically displaying a first data path between at least one source device and at least one target device; and in response to a failure in the first data path: graphically indicating the failure in the first data path; and graphically displaying a failover data path. This graphical display of the components of the computer system and the graphical indication of the failure in the first data path can be provide a more effective way of warning a system operator that the system has entered a failover state. Instead of a simple text message stating that the first data path has failed, this failure and subsequent failover to the second data path can be graphically displayed to thereby improve visibility to the system operator. This may result in a faster response by the user to replace the failed component.

In accordance with further embodiments of the present invention, an apparatus for managing the display of a plurality of data paths in a graphical user interface environment is provided. The apparatus comprises: a memory having program instructions; a processor configured to use the program instructions to graphically display at least one source device, graphically display at least one target device, graphically display a first data path between at least one source device and at least one target device, and in response to a failure in the first data path: graphically indicate the failure in the first data path and graphically display a failover data path.

In accordance with yet further embodiments of the present invention, a method of operating a storage system is provided. The method comprises: transmitting data from at least one application host to at least one storage system along a first data path; graphically displaying at least one component of at least one application host in a graphical user interface environment; graphically displaying at least one component of at least one storage system in the graphical user interface environment; and graphically displaying the first data path in the graphical user interface environment. In response to a failure in the first data path, the method further comprises: transmitting data from the application host to the storage system along a failover data path; graphically indicating the failure in the first data path in the graphical user interface environment; and graphically displaying the failover data path in the graphical user interface environment.

In accordance with yet further embodiments of the present invention, a computer-readable medium containing instructions for indicating a failover data path in a graphical user interface environment is provided. The instructions cause operations to be performed comprising: rendering a graphical representation of at least one source device on a computer display; rendering a graphical representation of at least one target device on the computer display; rendering a graphical representation of a first data path between at least one source device and at least one target device; and in response to a failure in the first data path: graphically indicating the failure in the first data path; and rendering a graphical representation of a failover data path.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

Some portions of the detailed description which follows are presented in terms of procedures, steps, logic blocks, processing, and other symbolic representations of operations on data bits that can be performed on computer memory. A procedure, computer-executed step, logic block, process, etc., are here conceived to be a self-consistent sequence of steps or instructions leading to a desired result. The steps are those utilizing physical manipulations of physical quantities. These quantities can take the form of electrical or magnetic signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations of any of these.

Figure 1:
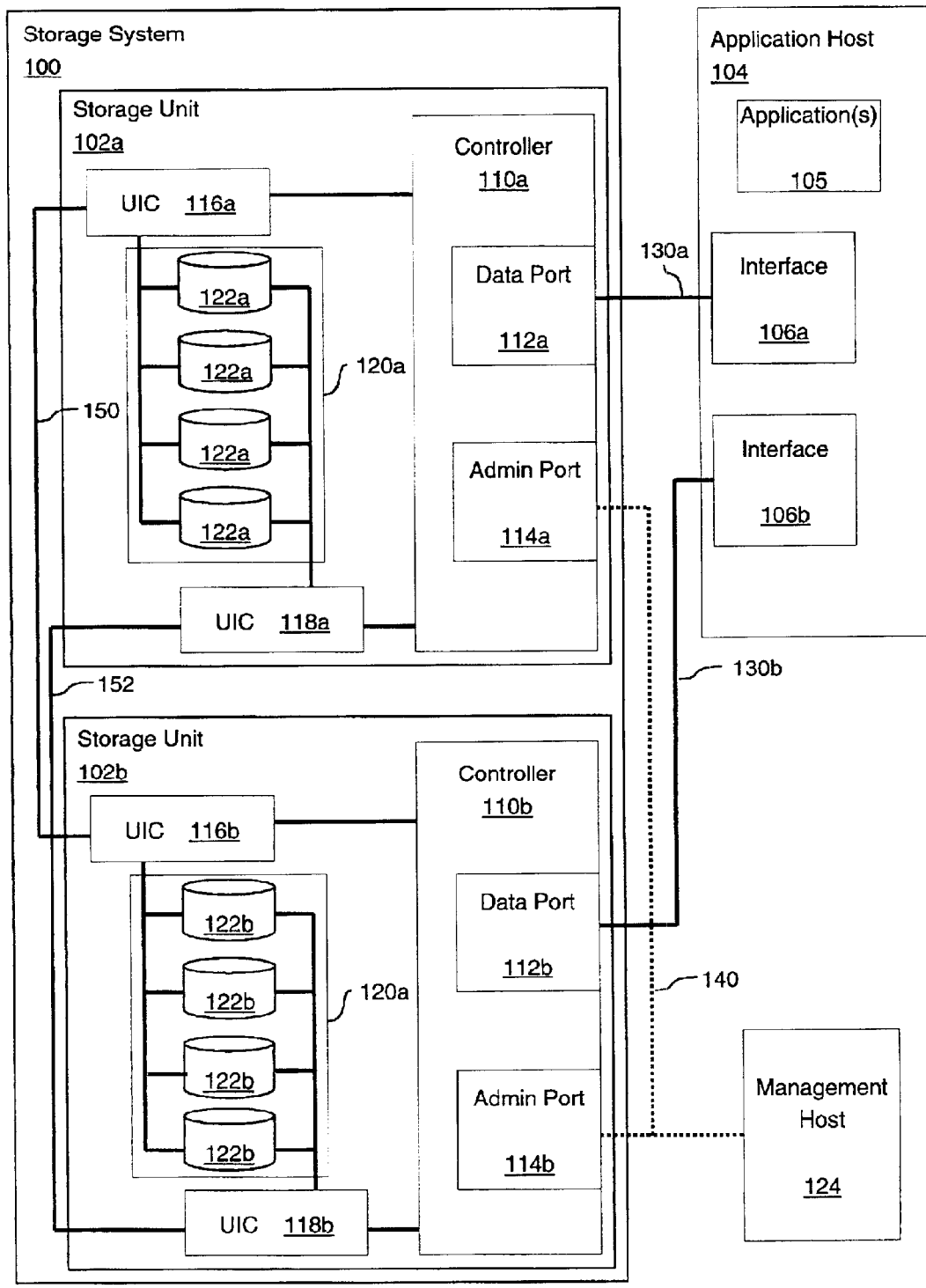
FIG. 1 shows a functional block diagram of a storage system in accordance with embodiments of the present invention.

FIG. 1 is a block diagram that illustrates an exemplary arrangement in which embodiments of the present invention may be implemented. As shown in FIG. 1, a storage system 100 stores and retrieves data from one or more applications 105 running on application host 104. This data can be stored in one of two storage units 102a–102b provided in storage system 100.

Application host 104 may be any of a number of computer systems, such as, for example, a UNIX server or a computer running the Windows NT or Windows 2000 operating systems.** One embodiment for application host 104 is described in greater detail in the text below corresponding to FIG. 2. Application host 104 may be provided with two interfaces 106a–106b, which are coupled to data ports 112a, 112b in storage system 100 via connections 130a, 130b, respectively. Interfaces 106a–106b, may be, for example, Fibre Channel-Arbitrated Loop ("FCAL") host bus adapter cards which receive data from a local bus on application host 104 and transmit the data to storage system 100.

** UNIX is a registered trademark of The Open Group; Windows and Windows NT are trademarks of Microsoft Corporation.

In the embodiment shown, storage units 102a–102b comprise two substantially identical controller units which are paired in a partner group to provide redundant controllers and redundant data and management paths. In other embodiments, the number and extent of redundant components within storage system 100 may vary.

Each storage unit 102 includes a controller 110 coupled to a pair of unit interconnect cards ("UIC") 116, 118. Each UIC 116, 118 is coupled to an array 120 of storage devices 122. Storage devices 122 may be, for example, hard disk drives or any other devices for storing data in non-volatile form, such as optical disks, floppy disks, or tape storage. In addition, UIC 116a in storage unit 102a can also be coupled via connection 150 to UIC 116b in storage unit 102b. This enables data received by storage unit 102a to be transmitted from UIC 116a to UIC 116b in storage unit 102b to be stored in storage devices 122b. This can be used to increase data throughput to storage devices 122b and/or to enable storage unit 102a and connection 150 to serve as a failover data path in the event of failure or other cessation of the primary data path to storage devices 122b through controller 110b.

Controller 110 may provide cache, RAID management, administration, diagnostics, and external interfaces for storage unit 102. In other embodiments, the functions performed by controller 110 may vary. For example, in some embodiments, controller 110 may provide only simple interfacing between application host 104 and storage devices 122. In the embodiment shown, controller 110 is provided with a data port 112 to provide connectivity with application host 104 and an administration port 114 to provide connectivity with a management host 124. Administration port 114 may be, for example, an Ethernet port coupled to management host 124 via network connection 140. In this arrangement, application host 104 generates the data to be stored in storage system 100, while management host 124 enables a user to perform various management and monitoring tasks on storage system 100.

Figure 2:
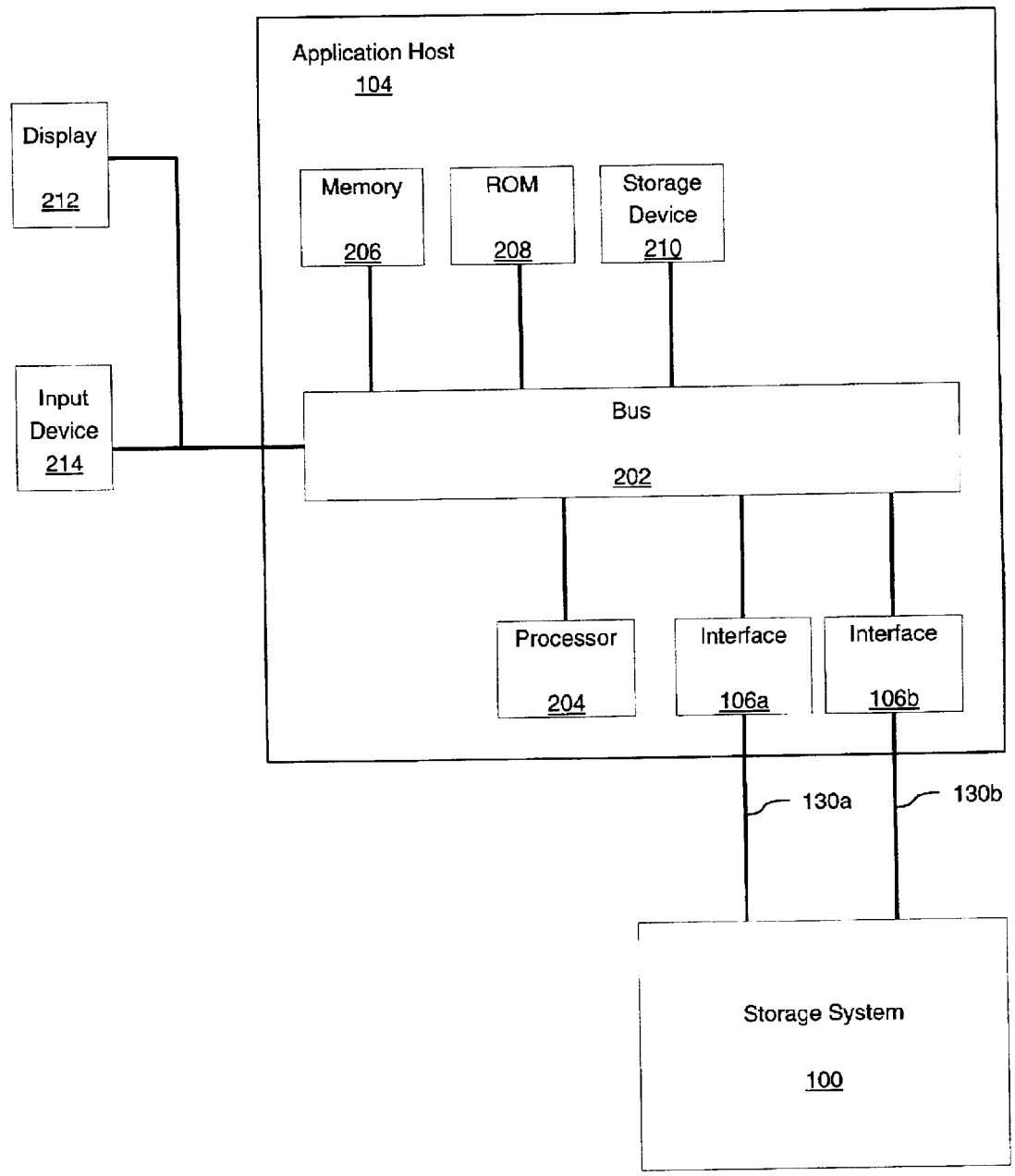
FIG. 2 shows a functional block diagram of an application host in accordance with embodiments of the present invention.

FIG. 2 is a block diagram that illustrates one embodiment of application host 104 of FIG. 1. Application host 104 includes a bus 202 or other communication mechanism for transmitting data, and a processor 204 coupled with bus 202 for processing information. Application host 104 also includes a memory 206, which can be a random access memory (RAM) or other dynamic storage device, coupled to bus 202 for storing information and instructions to be executed by processor 204. Memory 206 also may be used for storing temporary variables or other intermediate information during execution of instructions to be executed by processor 204. Application host 104 further includes a read only memory (ROM) 208 or other static storage device coupled to bus 202 for storing static information and instructions for processor 204. A storage device 210, such as a computer-readable magnetic disk or optical disk, can be provided and coupled to bus 202 for storing information and instructions, such as application(s) 105.

Application host 104 may be coupled via bus 202 to a display 212, such as a cathode ray tube (CRT) or liquid crystal display (LCD), for displaying information to a computer user. An input device 214, including alphanumeric and other keys, can be coupled to bus 202 for communicating information and command selections to processor 204. It is possible to implement methods consistent with the principles of the present invention on other devices comprising at least a processor, memory, and a display, such as a personal digital assistant.

Application host 104 also includes interfaces 106a–106b coupled to bus 202. As described above, interfaces 106a–106b may be used to provide I/O connectivity between application host 104 and storage system 100. Application(s) 105 running on application host 104 may transmit data via interfaces 106a–106b to be stored on the storage devices 122a–122b of storage units 102a–102b. In one embodiment, data intended to be stored in storage unit 102a is transmitted from interface 106a over connection 130a to data port 112a in controller 110a. The data then passes through either UIC 116a or UIC 118a to be stored on one or more of the storage devices 122a. This path between application(s) 105 and storage devices 122a comprises a first data path. Similarly, data intended to be stored in storage unit 102b is transmitted out of interface 106b over connection 130b to data port 112b in controller 110b. The data then passes through either UIC 116b or UIC 118b to be stored on one or more of storage devices 122b. This path comprises a second data path. Therefore, application host 104 has two independent data paths with storage system 100.

In the event that the first data path fails, a failover data path between application(s) 105 and storage devices 122a can be established. In one embodiment, data that would normally be routed out of interface 106a to controller 110a is instead routed out of interface 106b to controller 110b and then to UIC 116b. This data can then be transmitted via connection 150 to UIC 116a and then stored onto storage devices 122a. Alternatively, the data can be transmitted from controller 110b to UIC 118b, and then be transmitted over connection 152 to UIC 118a.

Many modern computer systems employ graphical user interfaces for displaying textual and graphical information to the user. Such graphical interfaces can facilitate computing by providing a quickly and easily comprehensible way in which to convey information to the user. It may be desirable to provide a graphical display to a user to indicate the status of the multiple data paths and to further indicate the presence of a failover data path.

Figure 3:
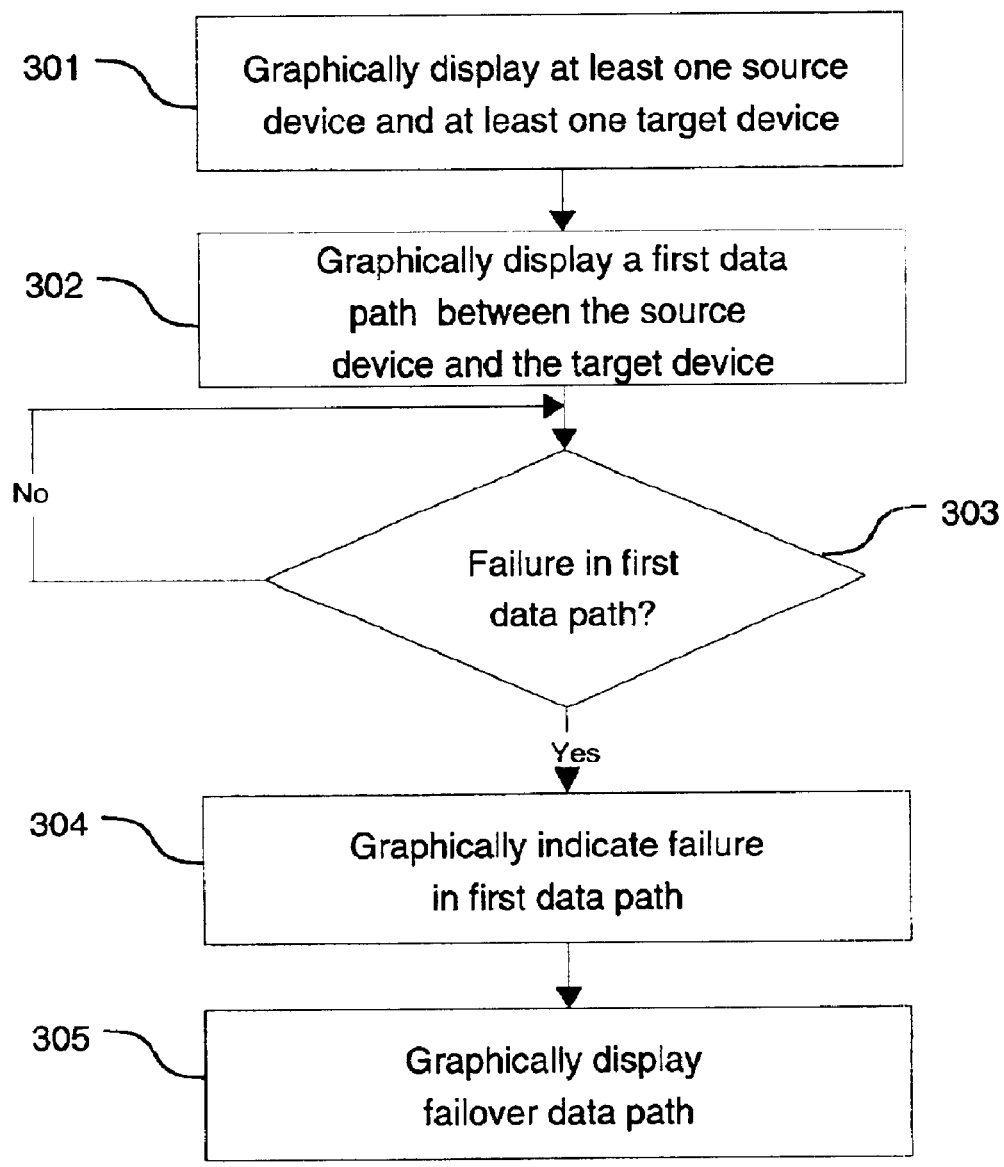
FIG. 3 shows a flowchart of a method for indicating a failover data path in accordance with embodiments of the present invention.

FIG. 3 shows a flowchart of a method for indicating a failover data path in accordance with embodiments of the present invention. In step 301, at least one source device and at least one target device are graphically displayed in a Graphical User Interface (GUI) environment. In step 302, a first data path between at least one source device and at least one target device is graphically displayed. Next, in step 303, if a failure in the first data path is detected, the failure in the first data path is graphically indicated in step 304. Finally, in step 305, a failover data path is graphically displayed.

Figure 4:
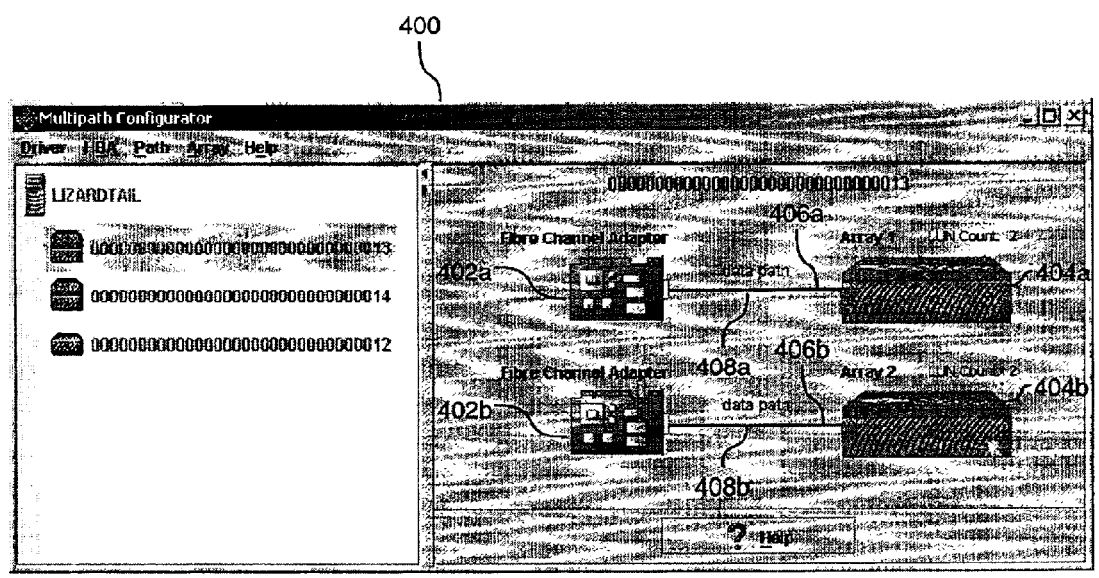
FIGS. 4–5 show exemplary Graphical User Interface (GUI) panels in accordance with embodiments of the present invention.
Figure 5:
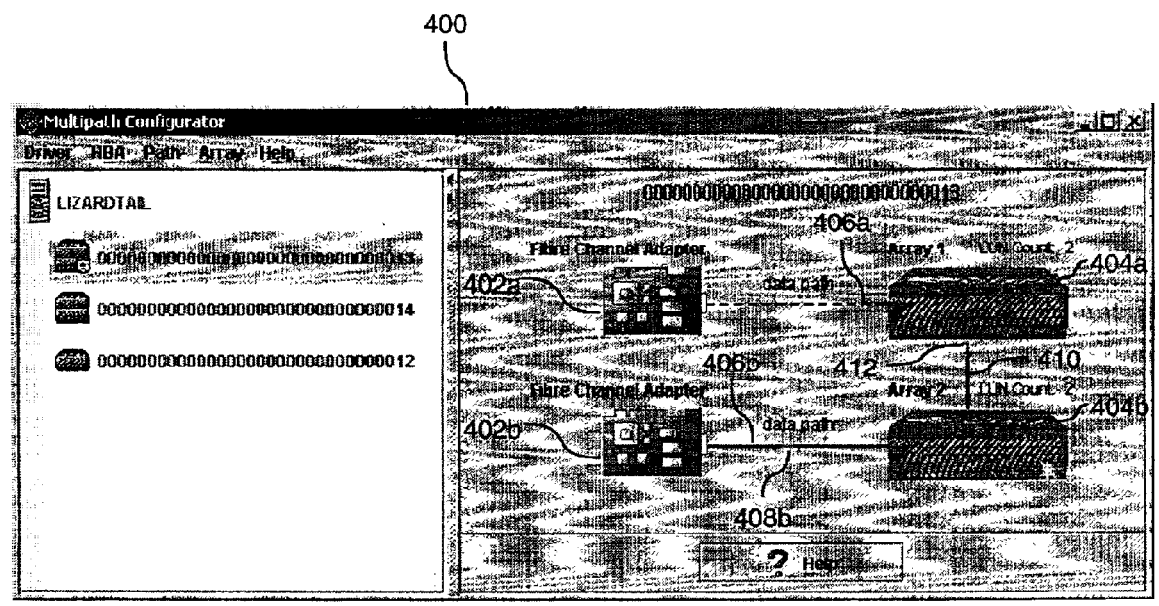

FIGS. 4 and 5 show exemplary GUI panels 400, 500 which may be generated by application host 104 in FIGS. 1–2 in accordance with embodiments of the present invention. In FIG. 4, two source device icons 402a–402b and two target device icons 404a–404b are graphically displayed. Source device icons 402a–402b correspond to interfaces 106a–106b and are displayed as graphical representations of two host bus adapter cards. Target device icons 404a–404b correspond to storage units 102a–102b and are displayed as graphical representations of the front portion of the physical enclosures for storage units 102a–102b. The graphical display can be provided on display 212.

In GUI panel 400, two data paths are also graphically displayed. The two data paths are shown as link 406a connecting source device icon 402a with target device icon 404a, and link 406b connecting source device icon 402b with target device icon 404b. The data paths can be visually distinguished in a variety of ways, such as, for example, by displaying colored segments, or by displaying an animated graphic. In the embodiment shown, links 406a–406b are graphically shown as lines having moving green portions 408a–408b which traverse the length of links 406a–406b to indicate that the data paths are active.

FIG. 5 shows an exemplary GUI panel 500 in which the failure in the first data path is graphically indicated. In panel 500, failed link 406a is graphically shown as a dashed line connecting source device icon 402a and target device icon 404a. In addition, the moving green portion 408a is omitted and can be replaced, for example, with a moving red portion. The failover data path is graphically shown as a link 410 having a moving green portion 412. When implemented in storage system 100, link 410 corresponds to either connection 150 or connection 152 and therefore is shown directly connecting target device icon 404a with target device icon 404b. In other embodiments, the failover data path can be shown in other ways, such as, for example, a link between source device icon 402b and target device icon 404a.

In the embodiments shown, GUI panels 400, 500 may be running on application host 104. The graphical display of the failover data path can be provided as part of an executable program which may perform various types of storage management tasks. In other embodiments, a separate management host 124 coupled to administration ports 114a, 114b via network connection 140 can be provided for performing storage management tasks, including the generation of GUI panel displays 400, 500 as described above. In these embodiments, the data being stored onto storage devices 122 is still transmitted from application host 104 via connections 130a, 130b to storage units 102a, 102b. In yet other embodiments, the graphical display of the failover data path may be provided on a browser application running on another computer system. Numerous variations are possible and contemplated.

While the invention has been described in terms of particular embodiments and illustrative figures, those of ordinary skill in the art will recognize that the invention is not limited to the embodiments or figures described. For example, the components that form the primary and target devices, the first and second data paths, and the failover data paths may vary. In some embodiments, a single application 105 transmits data to be stored on storage devices 122a and storage devices 122b. The source device in this case is application 105 and the target devices are storage devices 122a–122b, and the first and second data paths comprise the path taken by the data as it travels from application 105 to either storage devices 122a or storage devices 122b. In other embodiments, the data paths may comprise different portions of the path taken by data between the application 105 and the storage devices 122a–122b. For example, the first data path may be formed solely by the path from interface 106a to data port 112a. In other embodiments, the source device may comprise, for example, the entire application host 104, or one or more of the components thereof, such as application(s) 105 or interfaces 106a–106b. The target device may comprise, for example, the entire storage system 100, or one or more of the components thereof, such as data ports 112a–112b, controllers 110a–110b, UICs 116a–116b, 118a–118b, storage units 102a–102b, or individual storage devices 122a–122b. In various embodiments, the data paths may comprise any combination of the components connecting the source device(s) and the target device(s).

Figure 6:
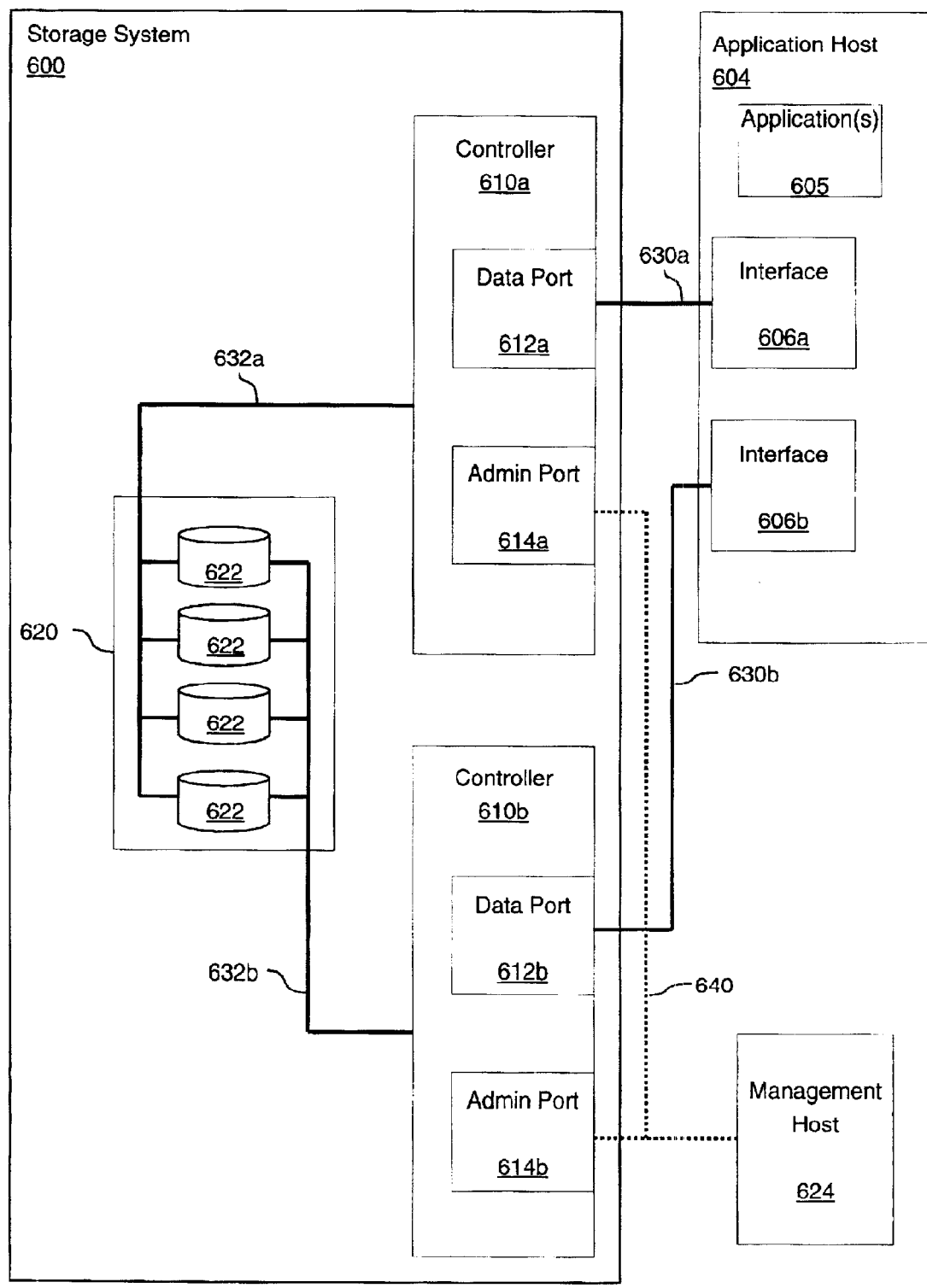
FIG. 6 shows a functional block diagram of a storage system in accordance with other embodiments of the present invention.

In the embodiment described above, storage units 120a and 120b are substantially identical partner pairs in storage system 100. In other embodiments, the two target devices need not be substantially identical, nor do they need to be components of a larger system. For example, the two target devices may be separate storage systems equipped to provide path failover for data being transmitted by host applications. In other embodiments, there may be only a single target device. FIG. 6 shows a functional block diagram of a storage system in which one or more applications 605 running on application host 604 transmit data to a single array 620 of storage devices 622 in storage system 600. Between application host 604, there are two data paths available between application(s) 605 and array 620. A first data path comprises interface 606a, connection 630a, data port 612a in controller 610a, and connection 632a, and a second data path comprises interface 606b, connection 630b, data port 612b in controller 610b, and connection 632b. In normal operation, both the first and second data paths may be used to transmit data, and in the event of a failure in the first data path, the second data path may then serve as the failover data path. In other embodiments, only the first data path is used in normal operation, and the second data path is reserved for failover use only. Numerous variations are possible and contemplated.

In the embodiment shown in FIG. 1, UIC 116a, 118a in storage unit 102a transmit data to storage devices 122a and also can be used to provide a failover data path for data to be stored in the other storage unit 102 in storage system 100. In other embodiments, these functions can be provided by separate components. For example, another interface may be provided in controller 110a for coupling with storage unit 102b in the event of failover. In yet other embodiments, interface 106a may be coupled to both storage unit 102a and 102b to provide failover data transmission to either storage unit 102.

It is also noted that the data paths can provide bi-directional data flow. For example, in addition to transmitting data from application host 104 to be stored in storage system 100, the data paths can also be used to transmit data retrieved from storage devices 122 to application host 104.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

The foregoing description of the preferred embodiments of the invention has been presented for the purposes of illustration and description. It is not intended to be exhaustive or to limit the invention to the precise form disclosed. Therefore, it should be understood that the invention can be practiced with modification and alteration within the spirit and scope of the appended claims.

What is claimed is:

1. A computer-implemented method of indicating a failover data path in a graphical user interface environment, said method comprising:
   graphically displaying at least one source device;
   graphically displaying at least one target device;
   graphically displaying a first data path between the at least one source device and the at least one target device comprising displaying a first link between the at least one source device and the at least one target device and animating the first link to indicate that the first data path has not failed; and
   in response to a failure in the first data path:
      graphically indicating the failure in the first data path; and
      graphically displaying a failover data path,
      wherein said graphically indicating the failure in the first data path comprises displaying the first link using a broken line.

2. An apparatus for managing the display of a plurality of data paths in a graphical user interface environment, comprising:
   a memory having program instructions; and
   a processor configured to use the program instructions to:
      graphically display at least one source device;
      graphically display at least one target device;
      graphically display a first data path between the at least one source device and the at least one target device comprising displaying a first link between the at least one source device and the at least one target device and animating the first link to indicate that the first data path has not failed; and
   in response to a failure in the first data path:
      graphically indicating the failure in the first data path; and
      graphically displaying a failover data path,
   wherein said graphically indicating the failure in the first data path comprises displaying the first link using a broken line.

3. A method of operating a storage system, comprising:
   transmitting data from at least one application host to at least one storage system along a first data path:
   graphically displaying at least one component of the at least one application host in a graphical user interface environment;
   graphically displaying at least one component of the at least one storage system in the graphical user interface environment;
   graphically displaying the first data path in the graphical user interface environment and displaying a first link between the at least one component of the at least one application host and the at least one component of the at least one storage system, and animating the first link to indicate that the first data path has not failed; and
   in response to a failure in the first data path:
      transmitting data from the at least one application host to the at least one storage system along a failover data path;
      graphically indicating the failure in the first data path in the graphical user interface environment; and
      graphically displaying the failover data path in the graphical user interface environment;
   wherein said graphically indicating the failure in the first data path comprises displaying the first link using a broken line.

4. A computer-readable medium containing instructions for indicating a failover data path in a graphical user interface environment, wherein said instructions cause operations to be performed comprising:
   rendering a graphical representation of at least one source device on a computer display;
   rendering a graphical representation of at least one target device on the computer display;
   rendering a graphical representation of a first data path between the at least one source device and the at least one target device and displaying a first link between the at least one source device and the at least one target device and animating the first link to indicate that the first data path has not failed; and
   in response to a failure in the first data path:
      graphically indicating the failure in the first data path; and
      rendering a graphical representation of a failover data path,
      wherein said graphically indicating the failure in the first data path comprises displaying the first link using a broken line.

* * * * *